United States Patent
Ito et al.

(10) Patent No.: US 6,709,173 B2
(45) Date of Patent: Mar. 23, 2004

(54) FOCAL-PLANE SHUTTER FOR CAMERA

(75) Inventors: Shinji Ito, Kamifukuoka (JP); Nobuyoshi Inoue, Kawagoe (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/454,539

(22) Filed: Jun. 5, 2003

(65) Prior Publication Data

US 2003/0228145 A1 Dec. 11, 2003

(30) Foreign Application Priority Data

Jun. 7, 2002 (JP) .................................... 2002-167451

(51) Int. Cl.$^7$ ................................................ G03B 9/40
(52) U.S. Cl. ....................................... 396/484; 348/362
(58) Field of Search ................... 396/483–492; 348/362

(56) References Cited

U.S. PATENT DOCUMENTS 4,024,550 A * 5/1977 Yazaki et al. ............... 396/195
4,334,747 A * 6/1982 Shimada et al. ............ 396/195

FOREIGN PATENT DOCUMENTS

JP 2002-055377 2/2002
JP 2002-055379 2/2002

* cited by examiner

*Primary Examiner*—David M. Gray
(74) *Attorney, Agent, or Firm*—Pillsbury Winthrop LLP

(57) ABSTRACT

A first blade actuating member and a second blade actuating member have pins, respectively. A movable contact member, which is urged to rotate in a counterclockwise direction, has locking arms and a contact piece member. When the first blade actuating member is rotated in the counterclockwise direction in photographing, the movable contact member causes a locking arm of to follow a pin of the first blade actuating member and causes the contact piece portion to come into contact with the contact piece portion of a stationary contact portion to thereby detect an abnormal actuation of the first blade actuating member by offset from normal timing. Next, when the second blade actuating member is rotated in the counterclockwise direction, a locking arm of the movable contact member is rotated by being pressed by a pin and causes the contact piece portion thereof to come into contact with the contact piece portion of the stationary contact portion to thereby detects an abnormal actuation of the second blade actuating member, similarly to the above mentioned.

2 Claims, 4 Drawing Sheets

FOCAL-PLANE SHUTTER FOR CAMERA

BACKGROUND OF THE INVENTION

1. Field of the Invention

The present invention relates to a focal-plane shutter for camera having a first blade and a second blade.

2. Description of the Related Prior Art

Of focal-plane shutters for camera, there has been known a focal-plane shutter arranged such that two blade chambers are formed between three plate members, which are called a shutter base plate, an intermediate plate, and an auxiliary base plate, and two shutter blades called a first blade and a second blade are individually disposed in these chambers as well as a first blade actuating member and a second blade actuating member are attached to the shutter base plate outside of the blade chambers so that the first and second blades are actuated thereby. This kind of the focal-plane shutter is employed in both silver-salt film cameras and digital still cameras.

Of this type of the focal-plane shutter, there are focal-plane shutters called a locking type and a direct type depending upon a method of holding the first and second blade actuating members at an exposure actuation start position. Of these two types of the focal-plane shutters, the locking type focal-plane shutter is such that when the first and second blade actuating members are actuated to setted positions by a setting member in a setting actuation, the respective actuating members are locked at the setted positions by locking members. Accordingly, the setting member returns to an initial position instantly after it cocks the respective actuating members. In photographing, a first blade electromagnet and a second blade electromagnet, which are controlled by an exposure control circuit, sequentially release the actuating members locked by the locking members to enable the first and second blades to start an exposure actuation.

On the other hand, in the direct type focal-plane shutter, when the first and second blade actuating members are actuated to the setted positions by the setting member in the setting actuation, these actuating members cause iron piece members attached thereto to come into contact with the first and second blade electromagnets. At this time, since the respective electromagnets are not energized, the setting member does not return to the initial position instantly and stay at the setted positions. In photographing, first, the respective electromagnets are energized so as to attract and hold the respective actuating members by magnetic force, and, thereafter the setting member returns to the initial position. When the first and second blade electromagnets are sequentially deenergized by the exposure control circuit, the respective actuating members start actuation so that the first and second blades execute an exposure actuation.

As described above, in either of the types, the respective actuating members start the actuation under the control of the electromagnets, respectively in photographing. Accordingly, when malfunction occurs in the control executed by the electromagnets, the respective actuating members do not start the actuation at normal timing, and a desired proper image cannot be obtained. To cope with the above drawback, in these types of the focal-plane shutters, it is conventionally proposed and executed to provide a detecting switch with each of the actuating members to detect whether or not they start the actuation at the normal timing. It is also known that a switch for detecting the actuation of the first blade actuating member also acts a synchronous switch.

The present invention relates to a focal-plane shutter having a function for detecting the abnormal actuation of the two actuating members, in other words, the abnormal actuation of the two shutter blades and capable of being employed in both the silver-salt film camera and the digital still camera. Incidentally, in these types of the focal-plane shutters, two switch mechanisms are necessary to detect the abnormal actuations of the two actuating members. Therefore, four contact members in total are ordinarily used heretofore. However, it is advantageous to employ three contact members and to use one of the contact members by the two switch mechanisms from a view point of cost reduction. Further, these switch mechanisms are required to have durability because they are bound to be actuated each time photographing is executed as well as they are required to detect an abnormal actuation without fail only when it occurs. Thus, when the contact member that is used by the two switch members as described above is provided, it is preferable that switch mechanisms be not turned on at the same time. Further, when the dual-purpose contact member as described above is provided and arranged as a stationary contact member similar to the other two contact members, these three contact members are restricted in a layout and required to be formed in a shape devised specially. Further, there is a possibility that a layout of other shutter constituting members is effected by the three contact members. Accordingly, when the three contact members are provided, they must have a degree of freedom in the layout thereof.

SUMMARY OF THE INVENTION

An object of the present invention is to provide a low cost focal-plane shutter for camera that is excellent in durability and has a degree of freedom in a layout.

To achieve the above object, a focal-plane shutter for camera includes a first blade actuating member for causing a first blade to execute an exposure actuation in photographing, a second blade actuating member for causing a second blade to execute the exposure actuation in the photographing, and a movable contact member coming into contact with a first stationary contact member in the photographing by moving from a neutral position following the actuation of the first blade actuating member, coming into contact with a second stationary contact member after moving beyond the neutral position by being actuated in an opposite direction by the second blade actuating member, and returning to the neutral position when the respective actuating members execute a setting actuation.

In the above arrangement, the focal-plane shutter can be very preferably arranged as a focal-plane shutter for digital still camera by arranging the shutter so that photographed data starts to be transferred from an imaging device to a memory when the movable contact member comes into contact with the second stationary contact member at the time the first blade and the second blade execute the exposure actuation normally.

Further, the focal-plane shutter according to the present invention has such features that it can be manufactured at low cost by reducing the number of parts, is excellent in durability, and has a degree of freedom in a layout of respective contact members.

This and other objects as well as the features and advantages of the present invention will become apparent from the following detailed description of the preferred embodiment when taken in conjunction with the accompanying drawings.

DETAILED DESCRIPTION OF THE PREFERRED EMBODIMENT

Figure 1:
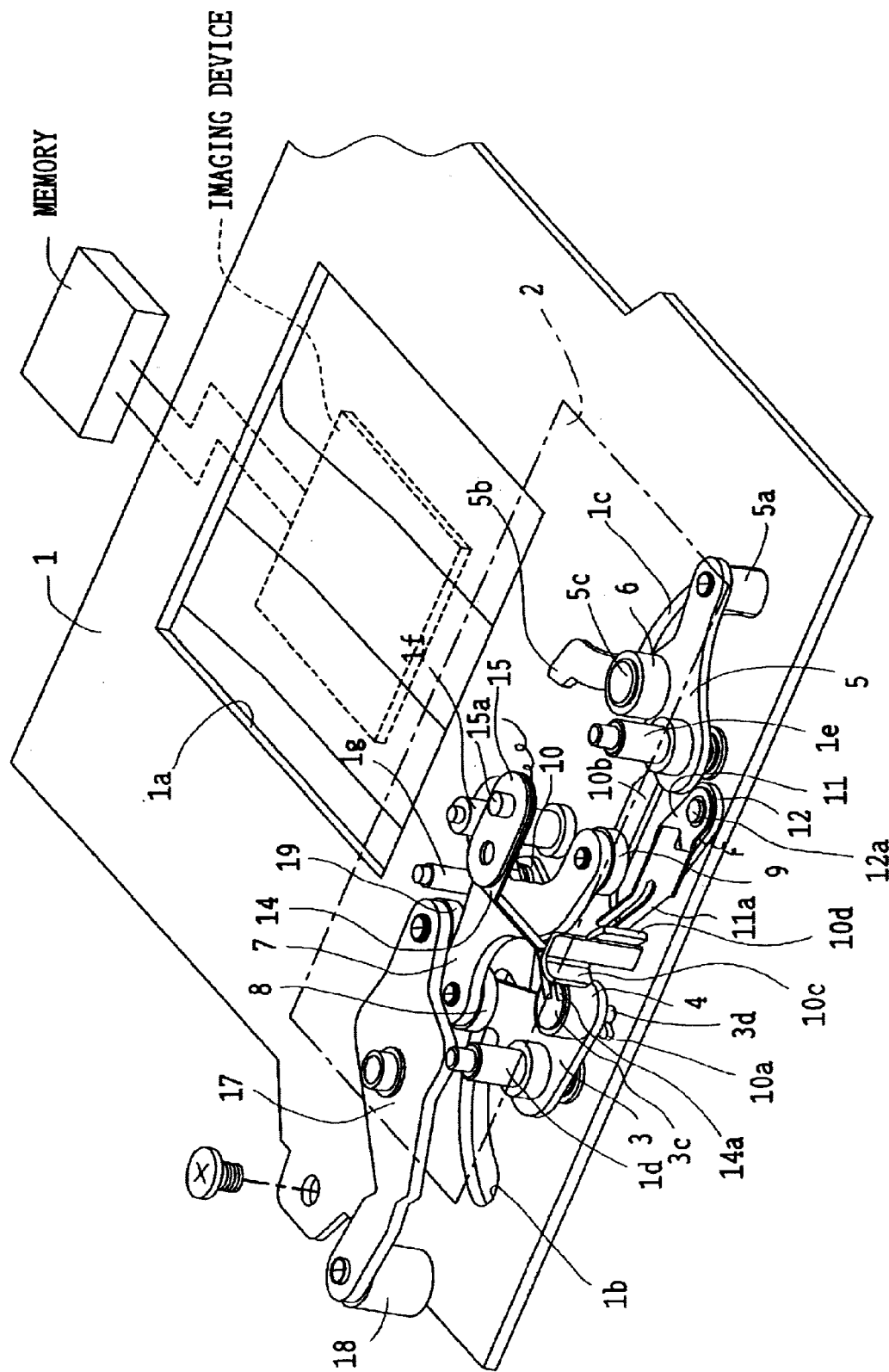
FIG. 1 is a perspective view showing a setted state of a focal-plane shutter of an embodiment according to the present invention.

FIG. 1 is a perspective view of an embodiment of the present invention in a setted state. In FIG. 1, portions that do not directly relate to the invention are not shown or are schematically shown. However, these portions will be made apparent in the following explanation of the arrangement of the embodiment.

Although the embodiment can be employed in either of silver-salt film cameras and digital still cameras, the following explanation will be made on the premise that it is employed in the digital still cameras for the sake of convenience.

Figure 2:
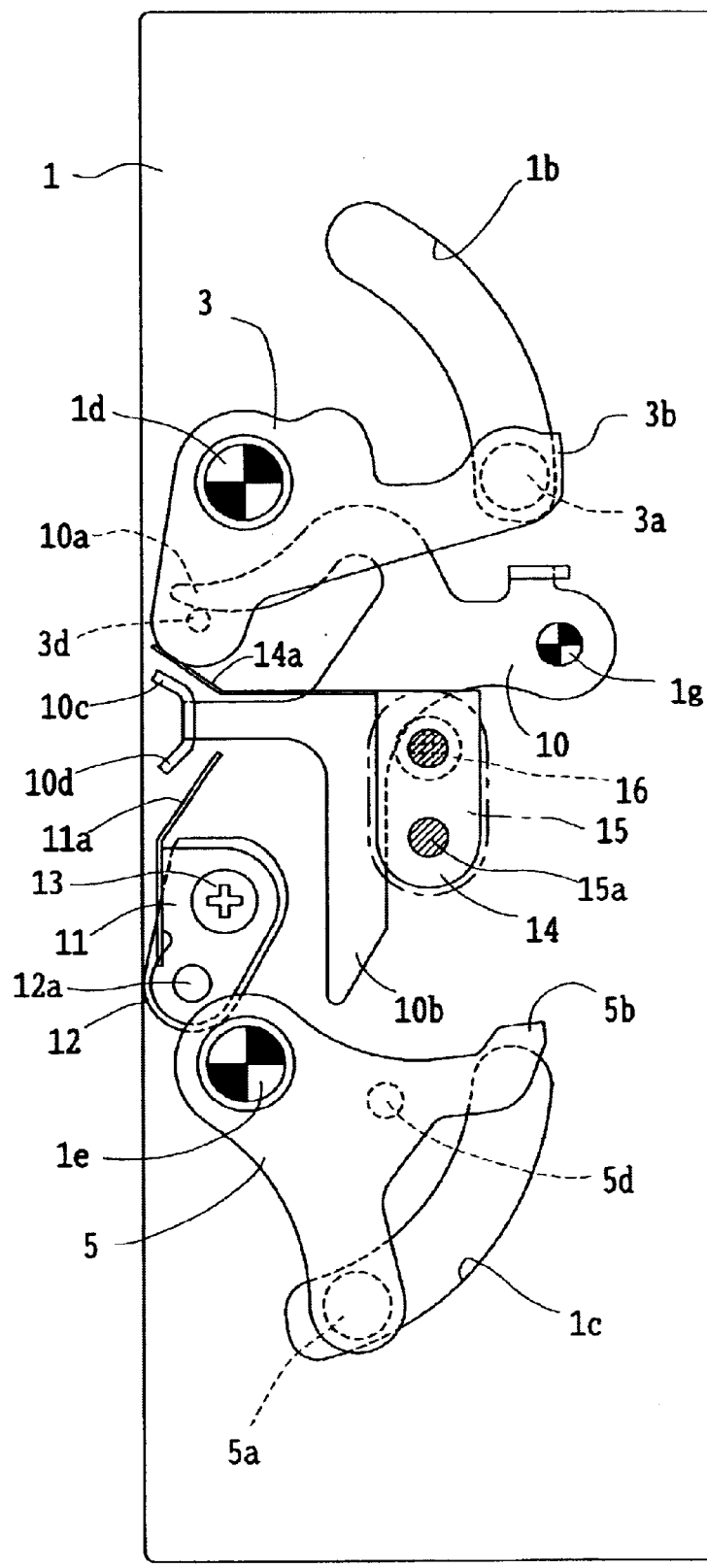
FIG. 2 is a plan view of a main portion arranging the focal-plane shutter shown in FIG. 1.

First, an arrangement of the embodiment will be described with reference to FIGS. 1 and 2. In FIG. 1, a shutter base plate 1 is made of metal and has an opening 1a formed at approximately the center thereof. Further, an intermediate plate and an auxiliary base plate are sequentially attached to a back surface of the shutter base plate 1 at predetermined intervals although they are not shown because they are known well. A blade chamber for a first blade is arranged between the shutter base plate 1 and the intermediate plate, and a blade chamber for a second blade is arranged between the intermediate plate and the auxiliary base plate. Openings similar to the opening 1a are also formed through the intermediate plate and the auxiliary base plate at the positions where the openings overlap the opening 1a, and an exposure aperture is regulated by at least one of these openings. An imaging device such as a CCD or the like is disposed on the back surface side (photographer side) of the exposure aperture and connected to a known memory. Further, as shown in FIG. 2, two arc-shaped slots 1b and 1c are formed on the left side of the opening 1a. Approximately C-shaped flat rubber buffers may be attached to the upper ends of these slots 1b and 1c.

Metal shafts 1d, 1e, 1f, and 1g stand on the shutter base plate 1. FIG. 2 shows the three shafts 1d, 1e, and 1g of in a simplified shape. Further, as known well, the shafts 1d and 1e are press-fitted into holes formed through the shutter base plate 1 and caulked on the blade chamber side. Accordingly, the shafts 1d and 1e project also on the blade chamber side. Although an upper base plate 2, which is called a support plate, a latchet plate or the like, is attached to the extreme ends of the shafts 1d, 1e, 1f, and 1g, the upper base plate 2 is shown by a dot-dash-line in FIG. 1 so that the figure is easily viewable. Note that although not shown shafts stand on the shutter base plate 1 and the upper base plate 2 in addition to the above shafts, they will be explained as necessary in respective cases.

A metal first blade actuating member 3 is rotatably attached to the shaft id and urged by a first blade actuating spring (not shown) so as to rotate in a counterclockwise direction in FIG. 2. Further, the first blade actuating member 3 includes an actuating pin 3a and a to-be-locked portion 3b disposed thereto. Although the actuating pin 3a is coupled with the first blade in the blade chamber passing through the slot 1b, FIG. 1 shows only four blades, which face the opening 1a, of the first blade because how the first blade is arranged and coupled is known well. Further, as shown in FIG. 1, a shaft 3c stands on the first blade actuating member 3 and a roller 4 is rotatably attached to the shaft 3c. The shaft 3c is force-fitted into a hole formed through the first blade actuating member 3 and caulked on the back surface side thereof, and the portion of the shaft 3c projecting to the back surface side is arranged as a pin 3d. In FIG. 2, only the pin 3d on the back surface side is shown by a broken line.

A metal second blade actuating member 5 is rotatably attached to the shaft 1e of the shutter base plate 1 and urged by a second blade actuating spring (not shown) so as to rotate in the counterclockwise direction in FIG. 2. The second blade actuating member 5 includes an actuating pin 5a and a to-be-driven portion 5b disposed thereto, and the actuating pin 5a is coupled with the second blade in the blade chamber passing through the slot 1c. Although how the second blade is arranged and coupled is omitted because it is known well, it is arranged similarly to the first blade except only that it is disposed at a position different from that of the first blade. As shown in FIG. 1, a shaft 5c stands on the second blade actuating member 5, and a roller 6 is rotatably attached to the shaft 5c. Further, the shaft 5c is caulked on the back surface side of the second blade actuating member 5 similarly to the shaft 3c of the first blade actuating member 3, the portion of the shaft 5c projecting on the back surface side is arranged as a pin 5d, and only the pin 5d is shown by a broken line in FIG. 2.

As shown in FIG. 1, a metal setting member 7 is rotatably attached to the shaft if of the shutter base plate 1 and urged by a spring (not shown) so as to rotate in the clockwise direction. The setting member 7 includes a roller 8, which can come into contact with the roller 4, and a roller 9, which can come into contact with the roller 6, attached thereto. A metal movable contact member 10 is rotatably attached to the shaft 1g of the shutter base plate 1 and urged by a spring (not shown) so as to rotate in the counterclockwise direction in FIG. 2. A locking arm 10a, which can come into contact with the pin 3d, a locking arm 10b, which can come into contact with the pin 5d, and two contact piece portions 10c and 10d are formed to the movable contact member 10, and they are electrically connected (grounded) to the shutter base plate 1 through the shaft 1g. Note that the shutter base plate 1 is electrically connected to a camera main body through an attachment screw shown on the left side of FIG. 1.

A stationary contact member 11 is attached to the shutter base plate 1 through an insulating member 12, a bifurcated contact piece portion 11a, which constitutes a switch together with the contact piece portion 10d, is formed to the stationary contact member 11, and a positioning pin 12a is formed to the insulating member 12 so as to pass through the front and back surfaces thereof. The stationary contact member 11 is attached to the shutter base plate 1 as described below. That is, first, one of the pin portions of the positioning pin 12a formed to the insulating member 12 is engaged with a hole formed through the shutter base plate 1; next, a hole formed through the stationary contact member 11 is engaged with the other pin portion of the positioning pin 12a; at the same time, another hole formed through the stationary contact member 11 is fitted into a cylindrical portion formed to the insulating member 12; thereafter, the hole of the cylindrical portion is aligned with the position of the hole formed through the shutter base plate 1, an insulating washer is placed on the hole, and a screw 13 (refer to FIG. 2) is inserted into the holes from the washer side and secured to the shutter base plate 1 through screw threads.

Although a lead wire is connected to the stationary contact member 11, the stationary contact member 11 is insulated from the shutter base plate 1.

On the other hand, a second stationary contact member 14 is attached to the upper base plate 2 through an insulating member 15. In FIG. 2, the outside shape of the insulating member 15 is shown by a dot-dash-line. Further, a bifurcated contact piece portion 14a, which constitutes a switch in cooperation with the contact piece portion 10c, is formed to the stationary contact member 14. A positioning pin 15a is formed to the insulating member 15 so as to pass through the front and back surfaces thereof. A method of attaching the stationary contact member 14 to the upper base plate 2 is substantially the same as that of the stationary contact member 11 and the insulating member 12. That is, first, one of the pin portions of the positioning pin 15a formed to the insulating member 15 is engaged with a hole formed through the upper base plate 2; next, a hole formed through the stationary contact member 14 is engaged with the other pin portion of the positioning pin 15a as well as another hole formed through the stationary contact member 14 is engaged with a cylindrical portion formed to the insulating member 15; thereafter, the hole of the cylindrical portion is aligned with the position of the hole formed through the upper base plate 2; and the stationary contact member 14 is secured to the upper base plate 2 by inserting a screw 16 (refer to FIG. 2) into the holes through an insulating washer interposed between. Then, although a lead wire is connected to the stationary contact member 14, the stationary contact member 14 is insulated from the shutter base plate 2.

Further, a transmitting member 17 shown in FIG. 1 is rotatably attached to a shaft (not shown) on the upper base plate 2. The transmitting member 17 includes two rollers 18 and 19 attached thereto. When the roller 18 is rotated in a clockwise direction by being pressed by a member (not shown) on the camera main body side, the setting member 7 is rotated in the counterclockwise direction by the roller 19. Although not shown, attached to the upper base plate 2, in addition to the components described above, are first and second blade locking members for locking the first and second blade actuating members 3 and 5 at setted positions, respectively, first and second blade electromagnets for releasing locking of the locking members, and the like.

Next, an actuation of the focal-plane shutter of the embodiment will be described. FIGS. 1 and 2 show a state in which the shutter is setted. In this state, the setting member 7 is rotated in the clockwise direction by the urging force of the spring (not shown) and stopped by a stopper (not shown). This position is an initial position of the setting member 7, and, at the initial position, the rollers 8 and 9 of the setting member 7 are greatly separated from the rollers 4 and 6 of the respective actuating members 3 and 5. Further, the roller 19 of the transmitting member 17 is rotated in the counterclockwise direction by being pressed by the setting member 7. Further, the first and second blade actuating members 3 and 5 are located at the setted positions against the urging force of the actuating springs, respectively, and the respective to-be-locked portions 3b and 5b are locked by the first and second blade locking members (not shown).

Accordingly, the first blade, which is coupled with the actuating pin 3a of the first blade actuating member 3, covers the opening 1a with the four blades thereof deployed, and the second blade coupled with the actuating pin 5a of the second blade actuating member 5 is accommodated at a lower position of the opening 1a in a state in which the four blades are folded. Further, as can be seen from FIG. 2, the rotation of the movable contact member 10 in the counterclockwise direction, which is caused by the urging force of the spring (not shown), is prevented by the locking arm 10a thereof that comes into contact with the pin 3d of the first blade actuating member 3 and is placed in a neutral state in which it is not in contact with any of the two stationary contact members 11 and 14, thereby both the two switches are turned off.

When a release button of a camera is pressed in this state, first, the first blade actuating member 3 starts an actuation, and after a predetermined time elapses, the second blade actuating member 5 starts an actuation. In ordinary day-light photographing, a slit is formed by a slit forming blade of the first blade and a slit forming blade of the second blade, an imaging surface is continuously exposed by the slit. However, the following explanation will be made mainly as to photographing in which flash is emitted after the first blade entirely opens an exposure aperture and the second blade starts to close the exposure aperture just after the emission of light for the sake of convenience.

First, when the release button of the camera is pressed, the first and second blade electromagnets are energized so as to attract and hold locking release iron piece members (not shown), thereby the camera is placed in an exposure actuation waiting state. When an AF unit, a diaphragm unit, a movable mirror unit, and the like have been actuated, the first blade electromagnet is deenergized in response to a signal from an exposure control circuit. With this actuation, the iron piece member attracted by the first blade electromagnet up to that time is released therefrom by the urging force of a spring, thereby the first blade actuating member 3 locked by the first blade locking member is released therefrom. As a result, the first blade actuating member 3 is rotated rapidly in the counterclockwise direction by the urging force of the first blade actuating spring (not shown) and actuates the four blades of the first blades to the upper portion of the opening 1a so that the opening 1a is opened.

Figure 3:
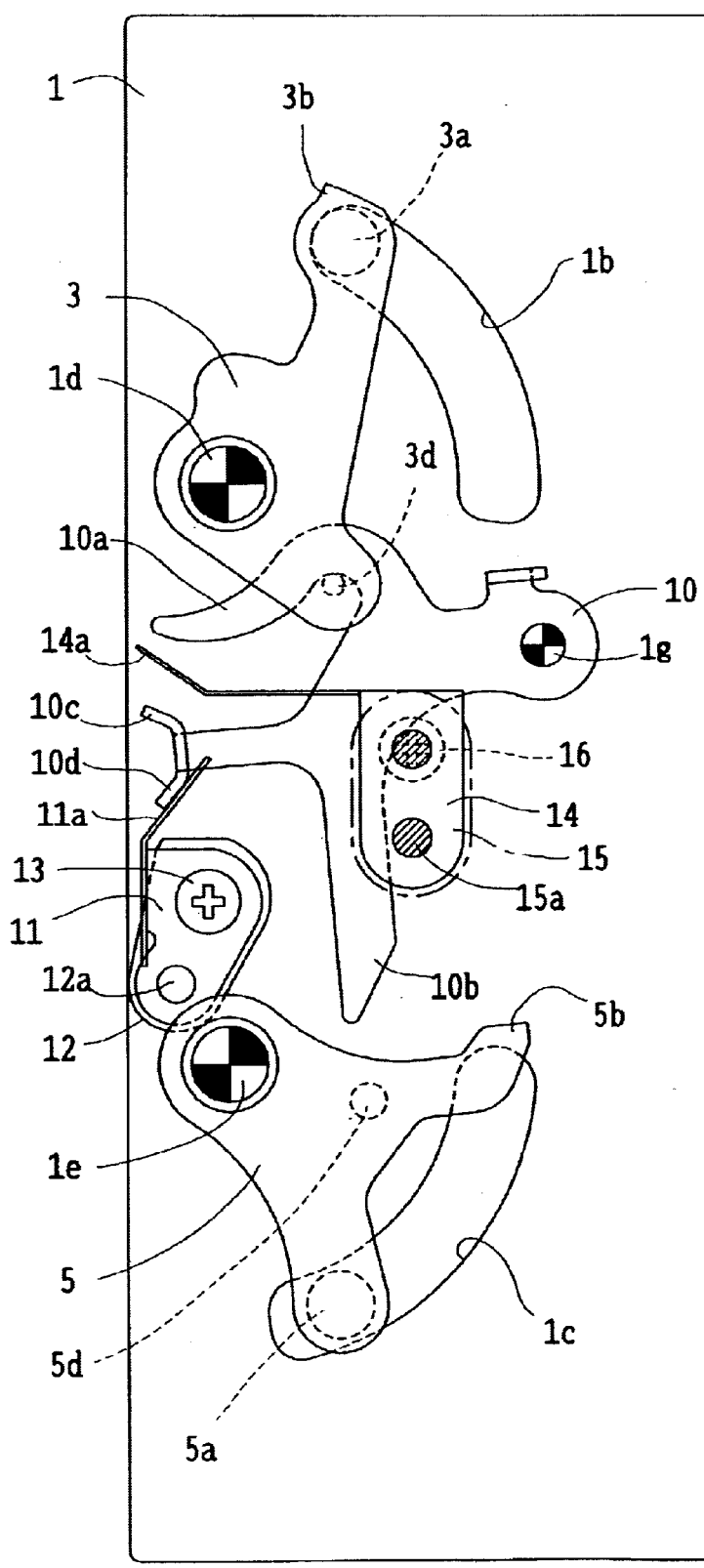
FIG. 3 is a plan view similar to FIG. 2 showing a state in which a first blade has finished an exposure actuation from the state shown in FIG. 2 but a second blade does not yet start an exposure actuation.

At this time, the movable contact member 10 is rotated in the counterclockwise direction because the locking arm 10a thereof is caused to follow the pin 3d by the urging force of the spring (not shown). Thereafter, when a stage, at which the first blade completely opens the opening 1a, is reached, the contact piece portion 10d of the movable contact member 10 comes into contact with the contact piece portion 11a of the stationary contact member 11, and immediately thereafter the actuating pin 3a of the first blade actuating member 3 abuts the upper end of the slot 1b of the shutter base plate 1 and stops thereat. Further, the contact piece portions 10d and 11a being in contact with each other cause the electronic flash to emit light. FIG. 3 shows a state of the shutter at the time.

The above explanation has been made as to a case in which the first blade actuating member 3 starts the actuation at normal timing. However, when, for example, a battery is depleted or dusts enter between the first blade electromagnet and the locking release iron piece member, sufficient attracting force cannot be obtained by the first blade electromagnet, so that the iron piece member is released from the first blade electromagnet earlier than the normal timing, thereby the first blade actuating member 3 being locked is released early. Further, if the iron piece member is not smoothly released because a spring is removed therefrom, the first blade actuating member 3 being locked may not be released at all or may be released later than the normal timing.

However, a time, at which the contact piece portion 10d of the movable contact member 10 comes into contact with the contact piece portion 11a of the stationary contact member 11 after the first blade electromagnet is deenergized is previously known. Thus, in this embodiment, when both the contact piece portions 10d and 11a come into contact with each other earlier than or later than the time or when they do not come into contact with each other at all, a warning circuit is actuated and notifies that a trouble occurs in the start of actuation of the first blade actuating member 3. The abnormal actuation of the first blade driving member 3 can be detected not only in photographing using flash but also in day-light photographing in which no flash is emitted. Accordingly, the switch composed of the two contact piece portions 10d and 11a acts as a switch for detecting the abnormal actuation of the first blade actuating member 3 but also acts as a synchronous switch for photographing using flash.

When the first blade entirely opens the opening 1a as described above, the second blade electromagnet is deenergized subsequently. Thus, the iron piece member attracted by the second blade electromagnet up to that time is released therefrom by the urging force of a spring, thereby the second blade actuating member 5 locked by the second blade locking member is released. As a result, the second blade actuating member 5 is rotated rapidly in the counterclockwise direction by the urging force of the second blade actuating spring (not shown) and actuates the four blades of the first blade to the upper portion of the opening 1a so that the opening 1a is closed. Thereafter, when a stage, at which the second blade completely covers the opening 1a, is reached, the locking arm 10b of the movable contact member 10 is pressed by the pin 5d and rotated in the clockwise direction by the urging force of the spring (not shown).

Figure 4:
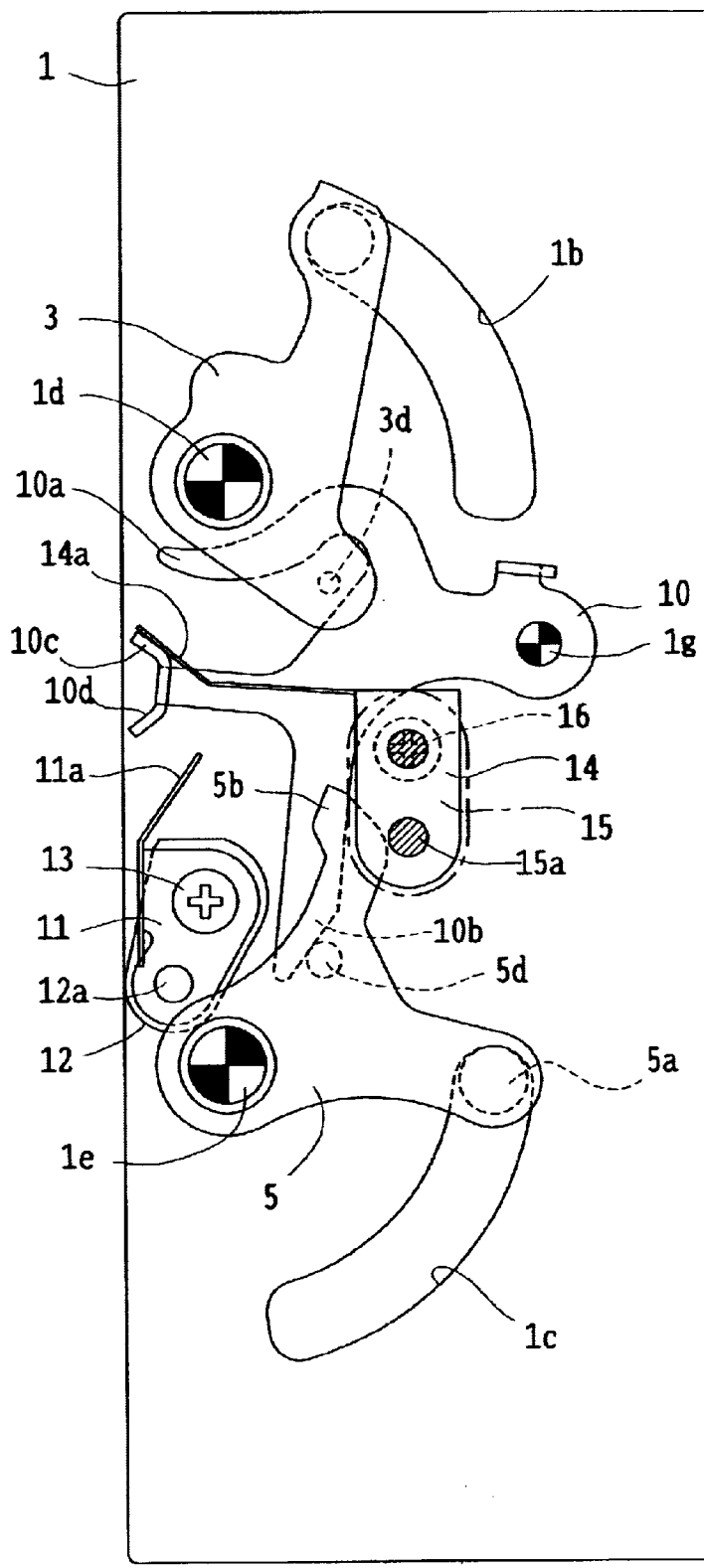
FIG. 4 is a plan view similar to FIG. 2 showing a state in which the second blade has finished the exposure actuation from the state of FIG. 3.

When the movable contact member 10 moves beyond a neutral position, the contact piece portion 10c thereof comes into contact with the contact piece portion 14a of the stationary contact member 14. At this time, however, since the second blade has closed the opening 1a and finished the exposure of the imaging surface, the imaging device is controlled in response to a signal from the switch composed of the two contact piece portions 10c and 14a through a control circuit (not shown), thereby charges accumulated in the imaging device as photographed data start to be transferred to the memory. Further, just after the second blade has closed the opening 1a and the two contact piece portions 10c and 14a have come into contact with each other, the actuating pin 5a of the second blade actuating member 5 abuts the upper end of the slot 1c of the shutter base plate 1 and stops thereat. FIG. 4 shows the state of the shutter at the time.

Incidentally, the second blade actuating member 5 may not start actuation at the normal timing because of various reasons and may start the actuation earlier or later the normal timing or may not start the actuation at all similarly to the first blade actuating member 3. However, a time, at which the contact piece portion 10c of the movable contact member 10 comes into contact with the contact piece portion 14a of the stationary contact member 14 after the first blade electromagnet is deenergized, is previously known. Thus, in this embodiment, when both the contact piece portions 10c and 14a do not come into contact with each other at the time, the warning circuit is actuated and notifies that a trouble occurs in the start of actuation of the second blade actuating member 5. The abnormal actuation of the second blade actuating member 5 is detected not only in photographing executed in a flash mode but also in photographing executed in any mode. Accordingly, the switch composed of the two contact piece portions 10c and 14a act as a photographed data transfer switch and also acts as a switch for detecting the abnormal actuation of the second blade actuating member 5.

When photographing is finished as described above, a setting actuation will be executed next. In this case, in the embodiment, the roller 18 is pressed by a member (not shown) on the camera main body side so that the transmitting member 17 shown FIG. 1 is rotated in the clockwise direction. Accordingly, the setting member 7 is pressed by the roller 19 and rotated against the urging force of a spring (not shown) in the counterclockwise direction from an initial position. As a result, the setting member 7 starts to sequentially press the rollers 4 and 6 through the rollers 8 and 9 so that the first and second blade actuating members 3 and 5 are rotated in the clockwise direction against the urging force of the actuating springs thereof.

When the first blade actuating member 3 starts to be rotated in the clockwise direction first, the four blades of the first blades, which are accommodated in the opening 1a at the upper position thereof, are actuated downward while reducing the folded amount of adjacent blades and travel into the opening 1a. At the time, however, the movable contact member 10 is not actuated because the locking arm 10b thereof remains restricted by the pin 5d of the second blade actuating member 5, as can be seen from FIG. 4. When the slit forming blade of the first blade and the slit forming blade of the second blade are placed in a predetermined folded state, the second blade actuating member 5 also starts to be rotated in the clockwise direction, thereby the four blades of the second blade are actuated downward while increasing the folded amount of adjacent blades. Thereafter, the first blade and the second blade are continuously actuated while preferably keeping the folded amount of the slit forming blades thereof.

Further, when the second blade actuating member 5 starts to be rotated in the clockwise direction, the locking arm 10b of the movable contact member 10 follows the pin 5d, thereby the movable contact member 10 is rotated in the counterclockwise direction by the urging force of the spring (not shown). However, the rotation of the movable contact member 10 is stopped when locking arm 10a abuts the pin 3d of the first blade actuating member 3 after the contact piece portion 10c is separated from the contact piece portion 14a of the stationary contact member 14. Thereafter, since the locking arm 10a is in sliding contact with the pin 3d, a state, in which the contact piece portion 10c is not in contact with the contact piece portion 14a as well as the contact piece portion 10d is not in contact with the contact piece portion 11a, can be maintained.

When the setting actuation is executed as described above, the four blades of first blade completely cover the exposure aperture in an unfolded state, and the four second blades are accommodated at the lower position of the opening 1a in a folded state, the first blade actuating member 3 is placed in a locking possible state by the first blade locking member (not shown), and the second blade actuating member 5 is placed in a locking possible state by the second blade locking member (not shown). When this stage is reached, since the roller 18 of the transmitting member 17 shown in FIG. 1 is released from the press force applied thereto from the member on the camera main body side, the setting member 7 is returned to the initial position while pressing the roller 19 by the urging force of the spring (not shown). Further, although the first and second blade actuating members 3 and 5 follow the set member 7 through the urging force of the actuating springs thereof in a very small amount at the initial stage of the returning actuation thereof, they are stopped by being perfectly locked by the first and second blade locking members. This is the setting state shown in FIG. 2.

Note that, in the above embodiment, the stationary contact members 11 and 14 are attached through the insulation members 12 and 15 because both the shutter base plate 1 and the upper base plate 2 are made of metal. However, when they are made of insulating synthetic resin, the insulating members 12 and 15 are not necessary. In this case, however, a lead wire must be connected to the movable contact member 10. Further, the movable contact member 10 and the stationary contact member 11 are attached to the shutter base plate 1 and the stationary contact member 14 is attached to the upper base plate 2 in the embodiment. However, these contact members may be attached to any of the shutter base plate 1 and the upper base plate 2 or all of them may be attached to the shutter base plate 1.

Further, while this embodiment is arranged as the locking type focal-plane shutter, it is needless to say that the present invention can be also applied to the direct type focal-plane shutter described above.

What is claimed is:

1. A focal-plane shutter for cameras comprising:

a first blade actuating member for causing a first blade to execute an exposure actuation in photographing;

a second blade actuating member for causing a second blade to execute the exposure actuation after the commencement of the actuation of the first blade in the photographing; and a movable contact member firstly coming into contact with a first stationary contact member in the photographing by moving from a neutral position following the actuation of the first blade actuating member by means of a biasing force of a spring, secondly coming into contact with a second stationary contact member after moving beyond the neutral position by being actuated in an opposite direction by the second blade actuating member against the biasing force of the spring, and returning to the neutral position by the biasing force of the spring when the respective actuating members execute a setting actuation.

2. A focal-plane shutter for camera according to claim 1, wherein when the first blade and the second blade normally execute the exposure actuation and the movable contact member comes into contact with the second stationary contact member, photographed data starts to be transferred from an imaging device to a memory.

* * * * *